No. 872,194. PATENTED NOV. 26, 1907.
R. M. PAXTON.
GLASS WORKING APPARATUS.
APPLICATION FILED FEB. 27, 1906.
3 SHEETS—SHEET 3.
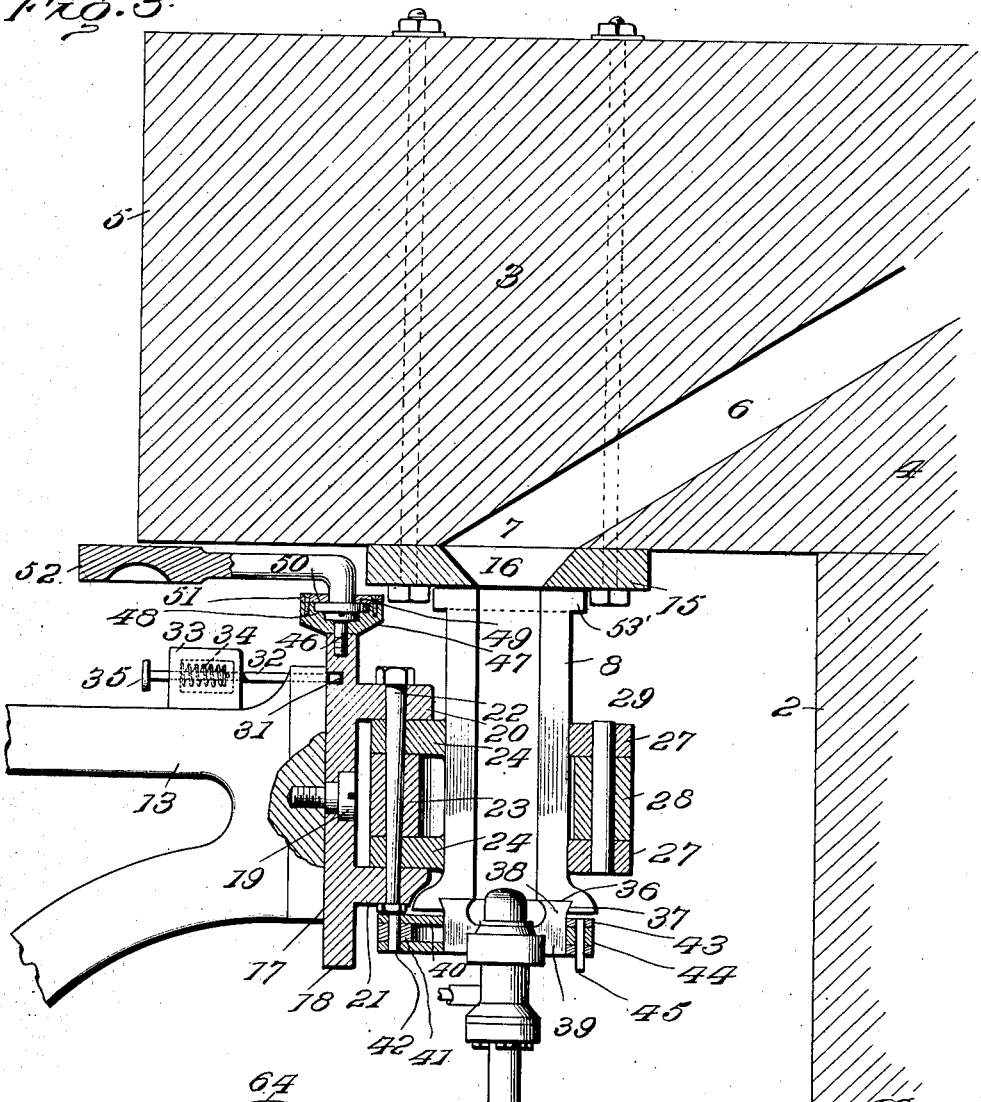

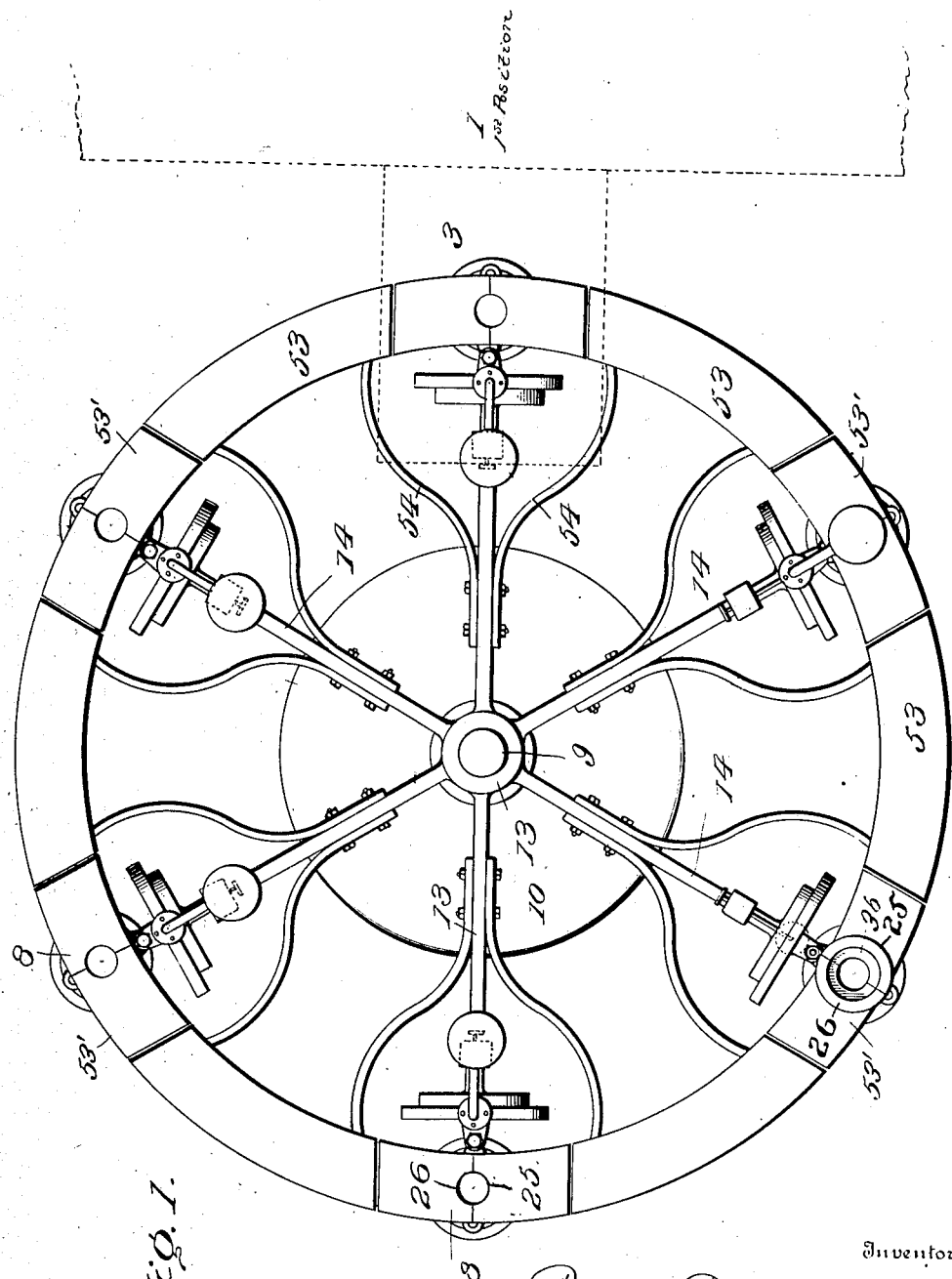

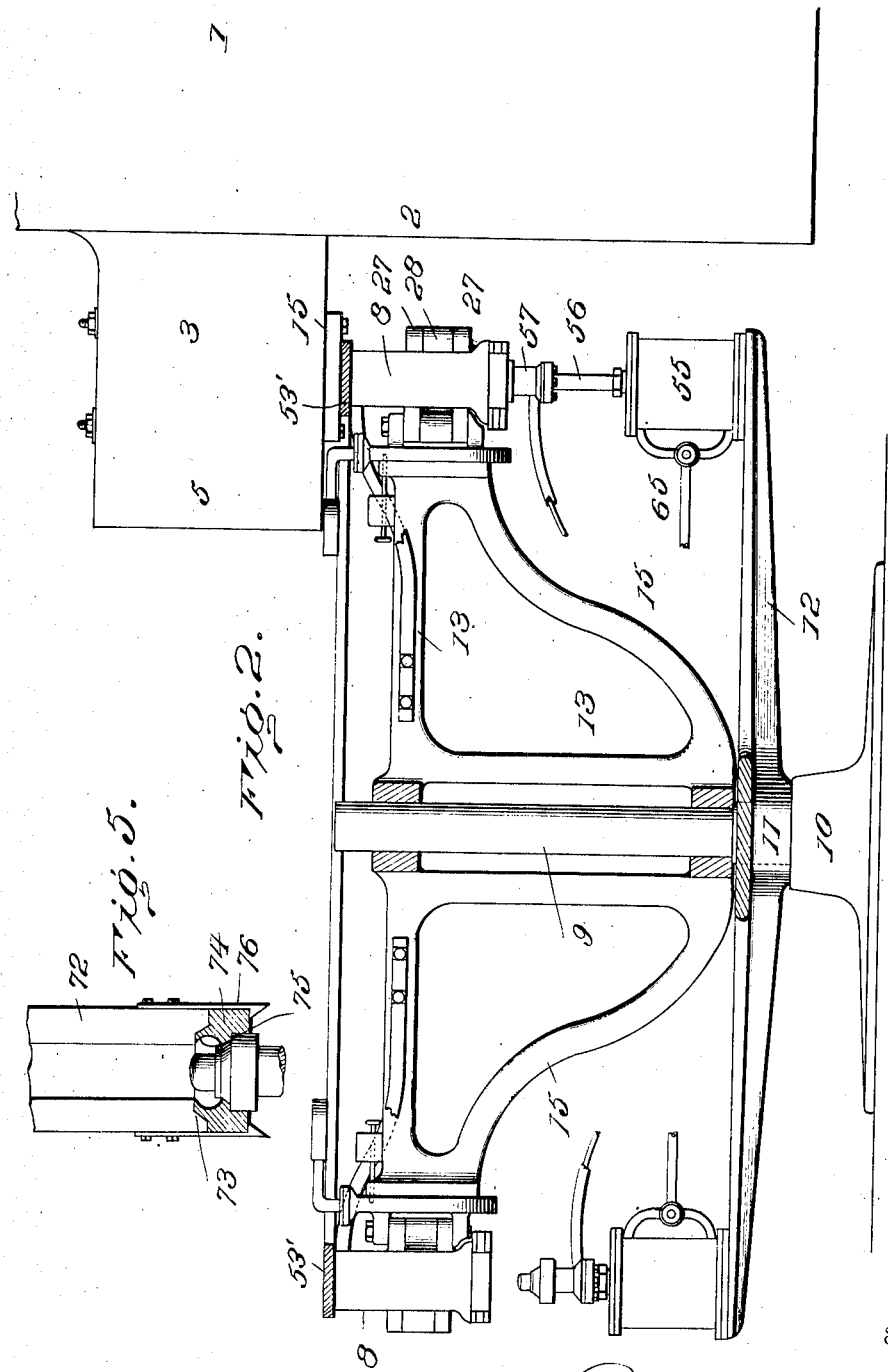

UNITED STATES PATENT OFFICE.

RICHARD M. PAXTON, OF WASHINGTON, PENNSYLVANIA.

GLASS-WORKING APPARATUS.

No. 872,194.  Specification of Letters Patent.  Patented Nov. 26, 1907.

Application filed February 27, 1906. Serial No. 303,198.

*To all whom it may concern:*

Be it known that I, RICHARD M. PAXTON, a citizen of the United States, residing at Washington, in the county of Washington and State of Pennsylvania, have invented certain new and useful Improvements in Glass-Working Apparatus, of which the following is a specification, reference being had therein to the accompanying drawing.

My invention relates to improvements in glass working apparatus, and pertains to a mechanism for forming a blank from a predetermined quantity of molten glass to be afterwards blown into the finished article in any well known manner.

The primary object of my improved machine is to do away with the usual gathering and pressing of the molten glass previous to the blowing operation.

In the accompanying drawings, Figure 1, is a top plan view of my improved apparatus for forming blanks from a predetermined quantity of molten glass. Fig. 2, is a transverse vertical sectional view taken on the line $x$—$x$ of Fig. 1. Fig. 3, is an enlarged vertical sectional view taken on the line $y$—$y$ of Fig. 1. Fig. 4, is an enlarged vertical sectional view of the plunger and blow head. Figs. 5 and 6 are vertical sectional views of modifications of the neck ring, and means for holding the molten glass in the mold.

Referring now to the drawings, 1 is a glass furnace and extending through the wall 2 thereof is a block 3 of suitable material. The block has its inner end projecting into the furnace 1, as shown at 4, and also outside of the furnace, as shown at 5. Extending diagonally through the block 3 is an outlet passage-way 6, the inner end of which communicates with the glass furnace at a point below the glass level, and its outer end 7 is outside of the furnace, and a sufficient distance from the outside of the wall 2 to enable a mold 9 to be placed under the block and register with said opening, as will be hereinafter more fully described.

A suitable distance from the tank I provide a vertically disposed standard 9 mounted upon the base 10, and rigidly carried thereby. Rotatably mounted upon said standard is a hub 11 which is provided with the raidally-extending arms 2 which, as shown, will be six in number, although any desired number may be used, as will also be hereinafter more fully described. Rotatably mounted upon said standard 9 above the hub 11, but secured thereto, is an elongated hub 13 which is provided at its upper end with radially-extending arms 14 which are six in number, and arranged directly above the arms 12. Secured to the lower end of the hub 12 are the brace arms 15 which extend upwardly and are secured to the outer ends of the arms 13.

Secured to the under side of the outer end of the block 3 is a plate 15 which is of any suitable metal, and this plate is provided with an opening 16 registering with the outer end 7 of the passage-way 6, and thus the plate 15, in conjunction with the upper end of the mold, causes a shearing action on the glass, as will be fully described.

The outer ends of the arms 13 are provided with broad vertical faces 17 to which are rotatably secured the vertical plates 18 by means of bolts 19, and thus the plate may be oscillated for inverting the mold 8, as will be hereinafter more fully described. The outer face of said plate 18 has laterally extending ears 20 and 21 through which passes the vertically-disposed bolt 22. Pivotally carried by the said bolt 22 between the ears are ears 23 and 24 carried by the mold sections 25 and 26, and thus the mold sections are supported upon the bolt 22 so as to oscillate, and thus the sections can be moved for opening the mold for removing the blank. The outer faces of the mold sections are provided with outwardly-extending interlocking ears 27 and 28 through which passes a locking key or pin 29, whereby the mold sections are held in their closed relation.

The inner face of the plate 18 is provided with an opening 31 in which the outer end of the spring-pressed pin 32 is normally held, and by means of which the mold is held in its normal vertical position. This pin 32 passes through a housing 33 carried by the arm 13, and in which is mounted the spring 34. The inner end of the pin 32 passes through the housing and is provided with a knot or handle 35 by means of which the inner end of the pin is withdrawn from the opening 31.

The lower ends of the mold sections are flared outwardly and formed with an annular recess 36 which is provided with beveled walls 37 which are adapted to receive the beveled projection 38 of the neck ring 39. The said neck ring is formed in two sections and provided with interlocking ears 40 and 41 which are pivoted together by a pin 42 whereby the neck ring may be opened. The outer ends of the ring sections are provided with interlocking ears 43 and 44 through which passes the locking pin 45 for holding the neck ring in its closed position.

The neck ring, as is readily seen, is held in the lower end of the mold when the same is closed, by the bevel portion 37 and cannot be removed when the mold is closed. When the mold is opened, the neck ring is then locked upon the glass blank for handling the same, and is removed therefrom by withdrawing the pin 45.

The upper end of the mold 8 extends upwardly against the lower face of the plate 15, and after the mold is filled with molten glass and the mold moved to the next position, there is a shearing action between the upper end of the mold and the plate 15, which cuts the glass and leaves the mold filled with glass up to the upper edge.

The upper end of the plate 18 has secured thereon by means of a screw 46, a circular cap 47 which is provided with a circular depression 48 in which rests an enlarged circular end 49 of the arm 50, and covering said enlarged end is a plate 51 screwed on the cap, and rotatably supporting the arm 50 thereon. The outer end of said arm is provided with an enlarged circular portion 52 which is adapted to be swung around and cover the upper open end of the mold after it has been moved out from under the block extending from the tank and adapted to hold glass within the mold when the same is inverted.

The several molds being carried by the radially arranged arms 15 are arranged in a circle so that each mold may be brought below the block 5 to be filled with molten glass. In order to prevent the molten metal from passing from the lower end of the opening 7 during the rotation of the frame for moving one mold from under the block, and bringing the next mold in position to receive the molten metal, I provide the space between the molds with segmental plates 53 which are supported by arms 54 carried by the arms 13. The said plates are supported in a plane with the upper face of the molds, and thus close the lower end of the opening 6 during the rotation of the table from one mold to the succeeding one. As clearly shown, the plates 53 form a circular table, leaving a space sufficient to allow the molds to be inverted.

The upper ends of the mold sections 25 and 26 carry the plates 53' which are preferably cast as a part of the mold sections, and are flush with the upper end thereof. The said plates 53' have their upper faces in a plane with the table 53 and form a continuation thereof to prevent the molten glass from passing from the opening 6 in the tank. The space between the plates 53 and 53' being sufficient to allow the mold sections carrying the same to be revolved or inverted.

As before described, the arms 12 are the same in number as the arms 13, and are arranged directly below the same, and are adapted to revolve with the same. The outer ends of said arms are provided with cylinders 55 which are arranged directly below the lower open end of the molds. The said cylinders are provided with pistons having the upwardly-extending piston rods 56 which are provided at their upper ends with the plugs 57 which are adapted to be raised by compressed air or steam within the cylinders through the medium of the piston rod, and close the lower end of the mold. The said plug or blow head for blowing the initial opening in the blank is formed as clearly shown in Fig. 4. The upper end of the piston is provided with an annular flange 58 to which is screwed the plug 57. The said plug is provided with an enlarged central longitudinal opening 59 which has its lower end closed by the upper end of the piston rod 50. The upper exterior formation of the plug is such as to conform with the neck ring, and thus close the lower end thereof, and said plug is provided with the extended portion 60 which forms an opening in the lower end of the blank, whereby the initial opening may be more accurately blown in the center of the neck of the blank.

Connected with and communicating with the central opening 53 is an enlarged pipe 61 through which a vacuum is created within the opening 59, and said opening has a series of openings 62 communicating with the interior of the mold and draws or sucks the molten glass down within the mold and holds the same therein during the initial blowing operation, as I will now proceed to describe. Extending through the pipe 61 is a small compressed air pipe 63 which extends within the opening 59 of the plug and extends upwardly and communicates with an opening 64 in the upper end of the head, and through which the compressed air is forced for blowing the initial opening in the blank.

In operation, a mold is brought below the opening 6 in the block 5 and simultaneously the steam is admitted through the pipe 65 to the cylinder 55 which forces the piston rod 56 upward and forces the plug 57 within the neck ring and tightly closes the lower end thereof, the vacuum drawing the glass within the mold. The table is then revolved which shears the glass, leaving the mold full of molten glass. In this second position, the plate is then swung over to cover the open upper end of the mold. The vacuum through the small openings 62 firmly holds the neck of the blank bottle within the neck ring, and compressed air being admitted through the pipe 63, blows the initial opening in the blank. In the next position caused by the rotation of the table, the pin 35 is pulled outward, releasing the plate 18 and allowing the same to be oscillated so that the mold is inverted, and the plate 52 prevents the blank from passing from the mold. In this position, the mold is opened, allowing the blank to be removed by the neck ring when it is afterwards put through the finishing blowing process. I have shown six molds which allow of the cooling of the same before it reaches the filling position again, and also gives ample time for the closing and placing of the neck ring in the lower end of the mold.

In Figs. 5 and 6, instead of the neck ring being carried by the mold, the same is carried by the plug and automatically coupled to the mold. In this form there is arranged a standard 66 adjacent the block 3, and provided with a sleeve 67 which is normally held downward by the spring 68 upon the stop 69. The said sleeve 67 is provided with an outwardly-extending arm 70 which is provided with an enlarged portion 77 at its outer end, which is located in a vertical line directly below the opening in the block. In this form, the mold section 72 at its lower end is provided with a beveled recess 73 which forms a guide for coupling the neck ring 74 thereto. The neck ring 74 is provided with an upwardly-extending beveled extension 75 which is adapted to engage the beveled wall 74 of the lower end of the mold section, and cause the same to center itself within the mold. The beveled end 70 of the hooks 76 are engaged by the side of the neck ring and forced outward until the hooked end passes the lower end of the ring, when they spring inward and firmly lock the neck ring to the mold.

In operation, in using the modification, the mold is brought below the opening in the block, and the plate 77 will be directly below the lower open end of the mold. The plunger is then forced upward which engages the plate 77, forcing the same upward and closing the lower end of the mold. The table is then started to revolve, shearing the glass at the upper end of the mold, and at the same time the plunger is retracted and the spring 68 forces the plate from below the mold, and allows the mold to be moved to second position. In this position, the plug is again forced upward, carrying the neck ring which is coupled to the lower end of the mold, and the action of the plunger in its vacuum and blowing operation is the same as heretofore described.

Having thus described my invention, what I claim and desire to secure by Letters Patent, is:—

1. A glass working apparatus, comprising a glass tank having an inclined outlet passage through its wall, the outer end of the outlet projecting beyond the outer face of the wall to permit a mold to be placed thereunder, and a movable mold adapted to be supported under and in communication with the projecting outer end of the said glass outlet.

2. A glass working apparatus comprising a glass tank, a block passing through the wall with its outer end projecting beyond the outer face of said wall, the block having an inclined passage-way, the inner end of which is in communication with the interior of the tank and its outer and lower end passing through the projecting portion of the blank, a movable mold adapted to be supported below and in communication with the outer end of said tank outlet.

3. A glass working apparatus, comprising a glass tank having a glass outlet, a rotatably supported frame having a series of molds adapted to be brought below and in communication with said outlet, each mold having a shearing action in combination with the tank, plates located in a plane with the upper end of the molds and spanning the space between them to close the tank outlet when the molds are moved, and a vertically-movable plug carried by the frame below each mold.

4. A glass working apparatus, comprising a glass tank having a glass outlet, a rotatably supported frame having a series of molds adapted to be brought below and in communication with said outlet, each mold having a shearing action in combination with the tank, plates located in a plane with the upper end of the molds and spanning the space between them to close the tank outlet when the molds are moved, neck rings removably supported by the lower ends of the molds and a vertically movable plug carried by the frame below each mold.

5. A glass working apparatus comprising a standard, a hub rotatably mounted therein, radially extending arms carried by said hub, mold sections pivotally mounted on the outer ends of said arms, means for locking said mold sections together, the lower end of said sections having an annular inwardly-beveled recess, neck rings having an outwardly-beveled projection within the recess in the mold section, whereby the same is supported by the mold, and a vertically-movable plug carried by the arms below each mold.

6. The combination with a glass mold, of a vertically-movable plug below said mold and having an enlarged chamber therein, a vacuum pipe in communication with said chamber, an air supply pipe extending through the chamber and in communication with a central opening in the upper end of the plug, and said plug having a series of openings surrounding the central opening below the same and in communication with the vacuum chamber, whereby the blank is drawn down and held during the initial blowing operation.

7. A glass blowing apparatus, comprising a rotatable frame, molds carried by said frame, a vertically-movable plate below the mold during the charging operation, a vertically-movable plug below the mold and adapted to move said plate upwardly for closing the lower end of the mold, a neck ring carried by the plug and means carried by the lower end of the mold for automatically locking the neck ring to the mold during the second position or operation of the plug.

8. A glass-working apparatus, comprising a glass tank having a glass outlet, a rotatably supported frame having a series of molds adapted to be brought below and in communication with said outlet, each mold having a shearing action in combination with the tank, means for closing the upper end of the molds, and means whereby the mold is inverted for removing the blanks.

9. A glass-working apparatus, comprising a glass tank having a glass outlet, a rotatably supported frame having a series of molds adapted to be brought below and in communication with said outlets, each mold having a shearing action in combination with the tank, means carried by the lower end of the mold for supporting the neck ring, means for closing the upper end of the mold, and means whereby the mold is inverted for removing the neck ring, together with the blank.

10. A glass-working apparatus, comprising a glass tank having a glass outlet, a rotatably supported frame having radially-extending arms, a plate rotatably carried by the outer end of each arm, mold sections pivotally supported by said plates, means for holding said plate in its normal vertical position, a plate pivotally carried by the upper end of the plate and adapted to close the upper end of the mold, a neck ring supported by the lower end of the mold sections when in their closed position, and whereby the mold sections are inverted and opened and the blank removed by the neck ring.

11. A glass working apparatus, comprising a glass tank having a glass outlet, a rotatably supported frame, having radially-extending arms extending below the tank outlet, a plate rotatably carried by the outer end of each arm, outwardly-extending arms carried by said plates, mold sections pivoted between said ears and adapted to register with the outlet in the tank, means for holding said sections in their closed relation, means for holding said plate in its normal vertical position, means carried by the lower end of said mold section for supporting a neck ring and means carried by the pivoted plate and adapted to close the upper end of the mold, whereby the mold is inverted by the rotation of the plate and the blank removed by the neck ring.

12. A glass working apparatus, comprising a glass tank having a glass outlet, a movable blank mold adapted to be supported below the opening and adapted to register therewith, means for severing the glass immediately above the mold and a blow plunger for forming a longitudinal cavity in the blank.

13. A glass working apparatus comprising a glass tank having a glass outlet, a blank mold below said opening and adapted to fill with glass through said opening, and a blow plunger for blowing a longitudinal cavity in the blank.

14. A glass working apparatus comprising a tank having a glass outlet a movable mold adapted to be supported below and in communication with the outlet in said mold having open ends, one end of the mold receiving the glass from the tank, means for severing the glass at the receiving end of the mold, and a blowing plunger adapted to co-act with the opposite end of the mold for blowing a longitudinal cavity in the blank.

15. A glass working apparatus comprising a glass tank, a blank mold, means for filling the blank mold with glass from the tank, and a blow plunger for blowing a longitudinal cavity in the blank.

16. The combination with a glass tank having a discharge outlet from which the glass may flow, of a movable blank mold adapted to receive the glass from the discharge outlet, a suction means for drawing the glass into the mold and holding it therein, and a blowing plunger for blowing a longitudinal initial opening in the blank.

17. The combination with a tank having a discharge outlet from which the glass may blow, of a movable blank mold adapted to receive the glass from the discharge outlet, and blowing means for blowing a longitudinal cavity in the blank while the mold is in filling position.

18. The combination with a tank of a blow mold adapted to receive the glass from the tank and blowing means for blowing a longitudinal initial cavity in the blank while the mold is in filling position.

19. The combination with a tank of a blank mold adapted to receive the glass from the tank and a blowing plunger for blowing an initial longitudinal opening in the blank while it is in filling position.

20. The combination with a tank of a blank mold adapted to receive the glass from the tank, a suction means for drawing and holding the glass in the mold, and means for blowing an initial longitudinal cavity in the blank while the mold is in filling position and the glass is being held by the suction.

21. The combination with a tank of a blank mold adapted to receive the glass from the tank a suction means for drawing and holding the glass in the mold, and a blowing plunger for blowing an initial longitudinal cavity in the blank while the mold is in filling position and the glass is being held by the suction.

22. The combination with a tank of a blank mold adapted to receive the glass from the tank, and a combined suction and blow plunger for drawing the glass down into the mold and holding it and blowing the initial longitudinal cavity in the blank.

23. The combination with a tank of a blank mold adapted to receive the glass from the tank and a combined suction and blow plunger for drawing the glass down into the mold and holding it and blowing the initial longitudinal cavity in the blank and means for severing the glass between the tank and the mold.

24. The combination with a tank of a blank mold adapted to receive the glass from the tank a suction means for drawing the glass into the mold and holding it and blowing plunger for blowing the initial longitudinal opening in the blank while the mold is in the filling position and the glass is held by the suction.

25. The combination with a tank of molten glass having a discharge outlet from which the glass may flow of a movable blank mold, mechanism for bringing the mold into such operative relation to the outlet of the tank or mold that the glass may flow thereinto, a suction means for drawing and holding the glass in the mold, and a blow plunger for blowing the initial longitudinal opening in the blank.

26. The combination with a tank of molten glass having a discharge outlet from which the glass may flow of a movable blank mold, mechanism for bringing the mold into such operative relation to the outlet of the tank or mold that the glass may flow there into, a suction means for driving and holding the glass in the mold, and a blow plunger for blowing the initial longitudinal opening in the blank, and a means for severing the glass in the mold from the supply thereof.

27. The combination with a tank of molten glass having a discharge outlet from which the glass may flow, of a movable blank mold, mechanism for bringing the mold into such operative relation to the outlet of the tank that the glass may enter therein, a suction means for drawing and holding the glass in the mold, a cut-off for severing the glass in the mold and tank and means for blowing the initial longitudinal opening in the blank.

28. The combination with a tank of molten glass, having a discharge outlet from which the glass may flow, of a movable mold having an upper body blank portion open at the top and lower neck portion, mechanism for bringing the opening in the mold into such operative relation to the outlet from the tank that the glass may enter therein, a suction means for drawing and holding the glass in the mold while in the receiving position, and a blow plunger for forming the initial longitudinal opening in the blank at the neck portion.

29. In a machine for making hollow ware, the combination of a movable blank mold having a fill opening, a pot or tank for molten glass having an outlet, means for moving the fill opening of the mold into operative relation to the outlet for molten glass in the tank or pot to fill the mold, and means for causing the blank to assume the shape of the mold by differential pressure at opposite ends thereof, to thereby form a blowing blank or parison, and means for blowing the initial longitudinal opening in the blank.

30. The combination with a tank or pot of molten glass having an outlet from which the molten glass flows, of a machine for making hollow ware, a movable blank mold having a fill opening, mechanism for moving the fill opening of the mold into filling relation to the outlet from the tank to fill the mold, mechanism for cutting off the glass in the mold, and means for causing the blank to assume the shape of the mold by differential pressure at opposite ends thereof to thereby form a blowing blank, and means for blowing the initial longitudinal opening in the blank.

31. The combination with a device for feeding molten glass of a machine for receiving the glass from the supply and shaping it into hollow ware, comprising a series of blank molds, each consisting of a body blank mold having an open lower end, a neck mold below the same, means for bringing the molds with their open upper end into operative relation to the feeding device, and a cut off for the glass controlled by the traveling movement of the machine, and means for blowing the initial longitudinal opening in the blank.

32. The combination with a tank or pot having an outlet from which the glass is adapted to flow, of a glass shaping machine having a series of molds, means for moving the molds into operative relation to the outlet of the tank, and means for exhausting the air from each mold successively as it is brought into such operative or filling position with the outlet of the tank, and means for blowing the initial longitudinal opening in the blank.

In testimony whereof I affix my signature in presence of two witnesses.

RICHARD M. PAXTON.

Witnesses:
RICHARD G. MILLER,
MINNIE A. LEONARD.